US012548420B2

(12) United States Patent
Nguyen

(10) Patent No.: US 12,548,420 B2
(45) Date of Patent: Feb. 10, 2026

(54) OPTICALLY CAPTURABLE PASSCODES AND AUDIBLE PASSCODES FOR PREMISES ACCESS

(71) Applicant: The ADT Security Corporation, Boca Raton, FL (US)

(72) Inventor: Tai Nguyen, Glenside, PA (US)

(73) Assignee: The ADT Security Corporation, Boca Raton, FL (US)

(*) Notice: Subject to any disclaimer, the term of this patent is extended or adjusted under 35 U.S.C. 154(b) by 0 days.

(21) Appl. No.: 18/663,731

(22) Filed: May 14, 2024

(65) Prior Publication Data

US 2025/0356747 A1 Nov. 20, 2025

(51) Int. Cl.

*G08B 13/196* (2006.01)
*G07C 9/00* (2020.01)
*G08B 7/06* (2006.01)
*G08B 25/00* (2006.01)

(52) U.S. Cl.

CPC ... *G08B 13/19656* (2013.01); *G07C 9/00309* (2013.01); *G08B 7/06* (2013.01); *G08B 25/008* (2013.01); *G07C 2009/00396* (2013.01)

(58) Field of Classification Search

CPC .. G08B 13/19656; G08B 7/06; G08B 25/008; G07C 9/00309; G07C 2009/00396

See application file for complete search history.

(56) References Cited

U.S. PATENT DOCUMENTS 10,347,063 B1 7/2019 LaRovere et al.
10,565,856 B2 * 2/2020 Sol .................... G07C 9/00174
10,643,412 B1 5/2020 Yang
10,713,740 B1 7/2020 Caputo
10,750,128 B2 8/2020 Fu et al.
11,004,284 B2 5/2021 Zilka
11,151,819 B2 10/2021 Huang et al.
11,361,060 B1 6/2022 Lyman et al.
2015/0228133 A1 * 8/2015 Capaldi-Tallon ........ G07C 9/27 340/5.65
2019/0005750 A1 1/2019 Eyring et al.
2020/0151977 A1 5/2020 Vos et al.
2020/0250959 A1 * 8/2020 Laurans ............... G08B 25/008
2021/0209881 A1 7/2021 Lemberger et al.
2024/0249572 A1 * 7/2024 Lingala .............. G07C 9/00563

FOREIGN PATENT DOCUMENTS

CA 2392405 A1 7/2001

* cited by examiner

*Primary Examiner* — Rowina J Cattungal
(74) *Attorney, Agent, or Firm* — Weisberg I.P. Law, P.A.

(57) ABSTRACT

According to some embodiments, a system is provided. The system includes at least one computing device in communication with a premises monitoring system, where the premises monitoring system is configured to monitor a premises. At least one computing device is configured to receive an image of an optically capturable passcode, the image being captured by the premises monitoring system, receive recorded audio of a person speaking an audible passcode captured by the premises monitoring system, authenticate the person based on the optically capturable passcode and the audible passcode, determine that the person is permitted access to the premises according to an access control policy, and, in response to authenticating the person and determining that the person is permitted access to the premises, cause a lock securing an access point of the premises to unlock.

18 Claims, 8 Drawing Sheets

OPTICALLY CAPTURABLE PASSCODES AND AUDIBLE PASSCODES FOR PREMISES ACCESS

TECHNICAL FIELD

The technology of the present disclosure is generally related to multifactor authentication for controlling access to premises monitored by a premises monitoring system.

BACKGROUND

There may be various reasons why people give access to their homes to neighbors, friends, family, delivery workers, service workers, etc. For example, a person may be out of town and need someone to look after the home and/or pets at the home. In another example, the person may be out of town but may have a company that provides recurring maintenance or service to the home or may expect an important delivery that would be safer if stored inside the home rather than remaining in front of the door or on the front porch.

The person may be left with limited options for providing access to the home while away. For example, the person may provide a neighbor with the physical home key and/or share a personal identification number (PIN) to a smart door lock or keep a backdoor unlocked on a particular date and time. However, the person away from the home is left with limited options for verifying who accessed the home, when the home was accessed, and why the home was accessed.

Further, companies that provide in-home grocery delivery may have issues with a home's security system as the homeowner or person away from the home may forget to disarm the security system on the grocery delivery day. Even though the delivery person may have a physical home key and/or a PIN for a smart door lock, the armed security system will still trigger, which will result in a false alarm and possibly monetary fines in certain jurisdictions. Even if the homeowner or person who is away from the home remembers to disarm the security system to mitigate the problem of false alarms, disarming the security system while the person is away from the home may negate the value of having a security system, since the home may be left unprotected by the security system for the entire day due to the 15-minute delivery.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Various embodiments described herein relate to using an optically capturable code (e.g., quick response (QR) code) and an audible passcode to authenticate a person for the purpose of providing temporary access to a home through a premises monitoring system. For example, when a homeowner decides to grant a visitor access to the homeowner's home at a future time, the homeowner may input the visitor's mobile phone number into a software application or web portal, and a QR code is sent to the visitor's mobile phone. Additionally, the visitor receives a voice phone call on the mobile phone that includes an automated message that provides an audible passcode for the visitor. When the visitor arrives at the home, the visitor uses a video doorbell device (or other device with a camera that is part of or in communication with the premises monitoring system) to capture the QR code. After the QR code is verified and prompted by the video doorbell device to speak the audible passcode, the visitor speaks the audible passcode previously provided through the voice phone call. If the audible passcode is verified, the visitor is deemed authenticated and granted temporary access to the home according to an applicable access control policy.

Figure 1:
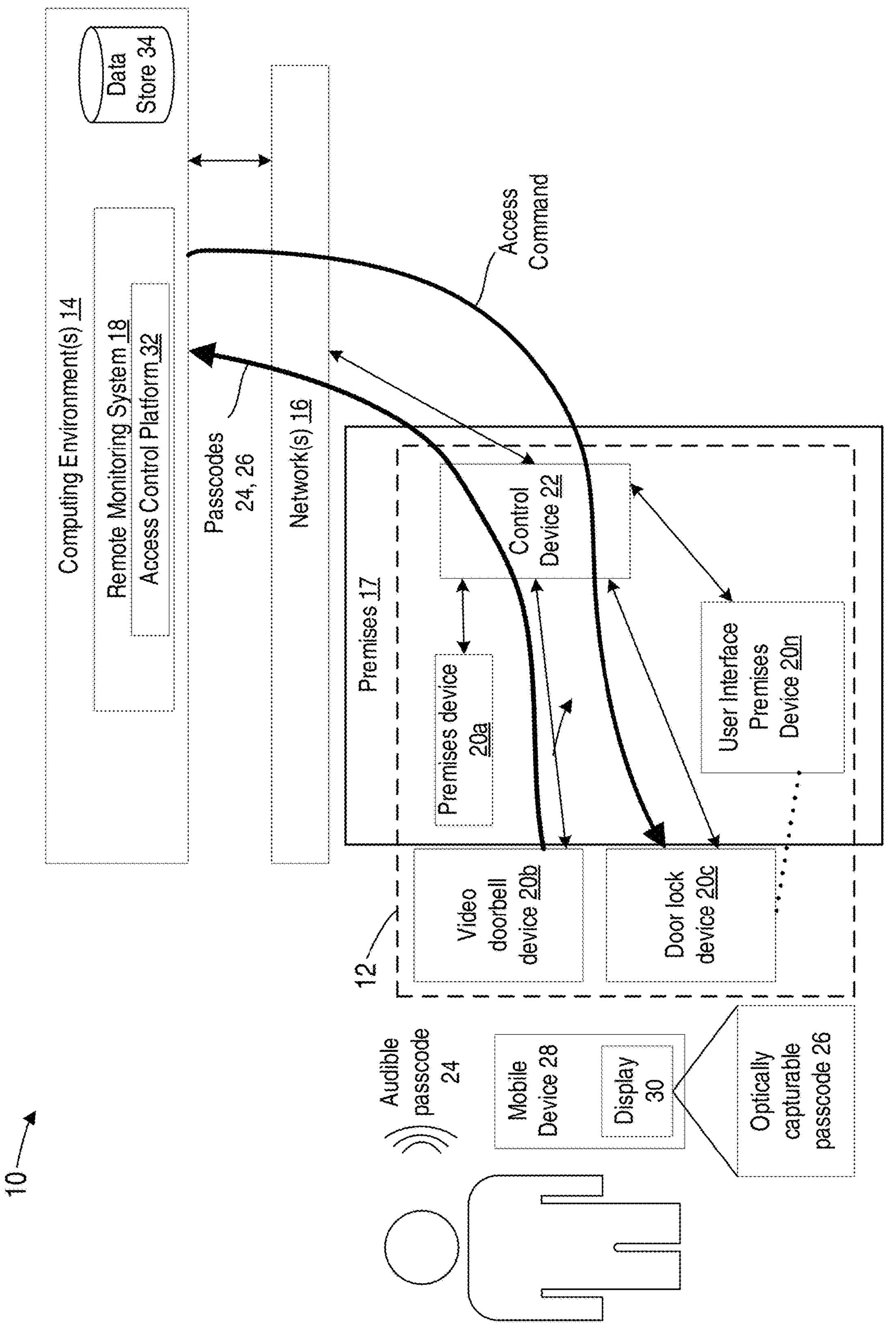
FIG. 1 is a block diagram of an example system according to some embodiments of the present disclosure.

With reference to FIG. 1, shown is a block diagram of an example system 10 according to some embodiments of the present disclosure. System 10 may include premises monitoring system 12 and one or more computing environments 14 that may communicate via one or more networks 16 (collectively referred to as network 16). Premises monitoring system 12 may be configured to provide functionality relating to monitoring premises 17. For example, premises monitoring system 12 may detect burglaries, smoke, fires, carbon monoxide leaks, water leaks, etc., and report detected events to remote monitoring system 18 of the computing environment 14. Additionally, the premises monitoring functionality performed by premises monitoring system 12 may include home automation functionality. Home automation functionality includes thermostat control, door lock control, lighting control, appliance control, entertainment system control, etc.

Premises monitoring system 12 may include one or more premises devices 20*a*-20*n* (collectively referred to as premises devices 20) for providing one or more of monitoring functionality, home automation functionality, etc. Premises devices 20 may be in communication with control device 22 via one or more networks such as, for example, a local area network at premises 17 and/or short-range wireless protocol network (e.g., BLUETOOTH, BLUETOOTH LOW ENERGY (BLE), ultra-wideband (UWB), ZIGBEE, Z-WAVE, among other Institute of Electrical and Electronics Engineers (IEEE) based wireless protocols, etc.). Premise device 20 may include one or more sensors, devices configured to capture audio, images, and/or video, and/or other devices. For example, premises devices 20 may include motion sensors, fire sensors, smoke sensors, heat sensors, carbon monoxide sensors, flood sensors, flow sensors, level sensors, temperature sensors, humidity sensors, proximity sensors, contact sensors, glass break sensors, water consumption sensors, water pressure sensors, etc. Devices configured to capture audio, images, and/or video may include still image cameras, video cameras, microphones, etc. Additional examples of premises devices 20 include sirens, garage door controllers, doorbells (e.g., configured to capture audio, images, and/or video), temperature sensors, humidity sensors, lighting devices, switches, electrical outlets, door locks, premises locks, and electrical plugs.

In one or more embodiments, premises device 20*b* may be a video doorbell device (referred to hereinafter as video doorbell device 20*b*) that is configured to capture audio (e.g., audio passcode(s) 24), images (e.g., including optically capturable passcode(s), 26 such as QR code 26), and/or video (e.g., including one or more of optically capturable passcode(s), 26 such as QR code 26, audio passcode(s) 24, etc.). In various embodiments, video doorbell device 20*b* may include still image cameras, video cameras, microphones, etc. For example, a mobile device 28 comprises a display 30 that is configured to display an optically capturable passcode 26 that video doorbell device 20*b* captures are part of a multi-factor authentication process described herein. Further, a person and/or mobile device 28 is configured to audibly emit audible passcode 24 (e.g., verbal passcode 24) that video doorbell device 20*b* captures are part of a multi-factor authentication process described herein. In various embodiments, voice passcodes 24 and optically capturable passcodes 26 are transmitted to the computing environment 14 via the control device 22 and network 16, as described herein.

Premises monitoring system 12 further comprises control device 22 that may be configured to control various aspects of premises monitoring system 12. For example, control device 22 may be configured to control premises devices 20, such as locks, doors, windows, actuators, valves, motors, and any other controllable devices associated with premises monitoring system 12. A control device 22 in various embodiments may include a user interface, such as one or more buttons, a touch screen, a display, a microphone, a speaker, and/or other types of user interface components, to facilitate a user interacting with and controlling the premises monitoring system 12. The control device 22 may also be configured to communicate with one or more components of the computing environment 14. Furthermore, the control device 22 may be configured to transmit data received from one or more premises devices 20 to components of the computing environment 14. According to various embodiments, control device 22 may be a gateway device, a hub, an alarm system panel, and/or another type of device configured to control aspects of premises monitoring system 12.

Further, the computing environment 14 may include a remote monitoring system 18, access control platform 32, and data store 34. Access control platform 32 is part of and/or a sub-component of remote monitoring system 18 in one or more embodiments. Remote monitoring system 18 may be configured to provide remote monitoring services for multiple premises monitoring systems 12. For example, in the event that an open door, open window, glass break, etc. is detected by a premises device 20 when premises monitoring system 12 is in an armed state, premises monitoring system 12 may transmit an alarm signal to remote monitoring system 18. In response, the remote monitoring system 18 and/or a human agent associated with remote monitoring system 18 may notify a public safety answering point (PSAP) for first responders, such as police, fire, emergency medical responders, etc., and/or one or more designated users associated with the premise monitoring system 12 via electronic messages and/or telephone calls.

Access control platform 32 of remote monitoring system 18 may be configured to allow temporary access (e.g., time-based access, alarm-based access, event-based access, guest access, etc.) to premises 17 to one or more people based on whether various authentication data (e.g., audible passcode 24, optically capturable passcode 26, etc.) meets at least one authentication criterion that may be stored in data store 34. In particular, access control platform 32 may be configured to provide one or more types of access to premises 17 via premises monitoring system 12. For example, certain types of users may be provided access to premises 17 for different types of access control. Different types of people may include the family of at least one person associated with premises 17 and neighbors with respect to premises 17 that are configured for access to premises 17 according to one or more access control levels. Further, another type of user may comprise one or more of guests, vendors, and/or service providers that may be associated with different types of access control for being granted access to premises 17.

Further, the different types of access control may comprise one or more of time-based access, alarm-based access, event-based access or guest-based access. Time-based access may provide a person with limited time to access one or more portions of premises 17, such as when a homeowner, resident, or other person associated with premises 17 is temporarily away from premises 17 and may want someone to enter premises 17 for a limited time. Alarm-based access may correspond to access that is triggered by an alarm event, such as an alarm event detected by a premises monitoring system 12, which may include, for example, leak detection alarms, smoke alarms, etc. and/or other event that may indicate a danger to life or property. Hence, controlled access to the premises may be provided in response to one or more alarms, allowing other users and/or first responders access to the premises 17.

Event-based access may correspond to providing access to premises 17 based on an event detected by premises monitoring system 12. For example, a fall may be detected by computing environment 14 and/or components of premises monitoring system 12 based on analytics performed on video recorded by a premises device 20 such that a person may be granted access to premises 17, after authentication described herein, to help the individual who fell. Guest-based access may comprise providing a guest (or helper, service person, etc.) access to premises 17 for a specific purpose. For example, the guest may be a dog walker who requires temporary access to premises 17 to get and walk the dog.

Further, access control platform 32 may be configured to perform functionality related to granting access, if any, to an authenticated person. For example, access control platform 32 may be configured to authenticate a person, and in response, retrieve access data or an access profile for the authenticated person. The access data or access profile may be stored in data store 34 and may indicate the one or more types of access control that apply to the user and one or more rules (e.g., criterion, criteria, access policies) that specify when to grant access. That is, one or more pre-configured rules may be stored in data store 34 and specify the type(s) of authentication acceptable for a particular user and how many authentication factors are required for the access control platform 32 to grant the person access to premises 17. The one or more rules may be based on one or more of:

day(s) of the week, time(s) of day, type of triggered alarm, type of detected event, type of vendor, the purpose of the person accessing the premises 17, etc. Access control platform 32 may function as a rules engine and may ensure premises monitoring system 12 is disarmed prior to unlocking a door to prevent false alarms.

In one or more embodiments, one or more types of access can be combined with additional rules or conditions, such as rules or conditions based on one or more of time of day, day of the month, premises monitoring system 12 modes (e.g., armed away, vacation mode, etc.) or a number of occurrences. The number of occurrences may correspond to the number of times a person is allowed entry to premises 17 within a predefined time window, such as one access attempt on Tuesday where subsequent access attempts on Tuesday will fail.

Data store 34 may be configured to store various information and/or data associated with authenticating a person as described herein. For example, data store 21 may store at least one authentication criterion (e.g., a rule) that specifies one or more conditions required for a person to be deemed authenticated for the purpose of granting the person access to premises 17. In some embodiments, the authentication criteria define one or more rules that must be satisfied for a person to be deemed authenticated for the purpose of granting access to premises 13. One example of a rule requires authentication to occur, within a time window, based on two or more forms of authentication data (e.g., audible passcode 24, optically capturable passcode 26, etc.). The time window may be initiated, for example, upon the access control platform 32 receiving the first authentication data. For example, in response to receiving first authentication data (e.g., optically capturable passcode 26), remote monitoring system 18 or access control platform 19 may trigger a countdown timer and an indication for a person to speak audible passcode 24, and the second authentication data (e.g., an audible passcode 24) may be required to be received before expiration of the timer in order to meet a rule.

Figure 2:
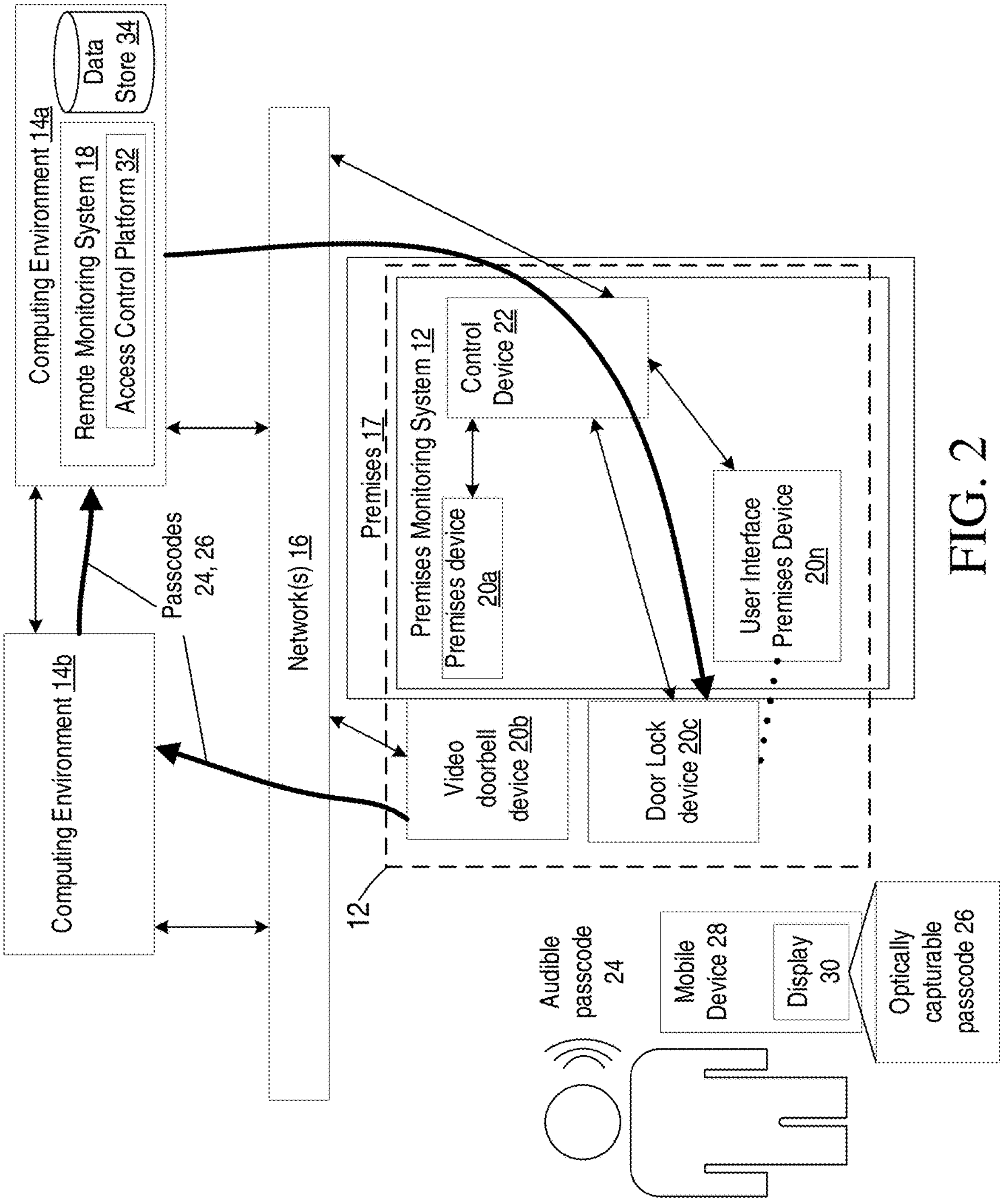
FIG. 2 is a block diagram of another example system according to some embodiments of the present disclosure.

FIG. 2 is a diagram of another example embodiment of a system 10. In the example depicted in FIG. 2, system 10 includes computing environment 14 (now referred to as computing environment 14*a*) as described with respect to FIG. 1. As shown in FIG. 2, the system 10 further includes computing environment 14*b*. In various embodiments, the computing environment 14*b* may be a computing system operated by a third party relative to the operator and/or service provider of the remote monitoring system 18 and/or access control platform 32. The computing environment 14*b* may be, for example, a cloud computing platform that provides cloud computing resources for multiple end-users. The cloud computing resources provided by the computing environment 14*b* may include, for example, cloud data storage and/or other resources.

In the example system 10 of FIG. 2, the video doorbell device 20*b* is configured to communicate with computing environment 14*b*. Computing environment 14*b* may be configured to store data (e.g., recorded audible passcode 24, image of optically capturable passcode 26, etc.) received from video doorbell device 20*b* and perform one or more functions on the data it receives and/or stores.

According to some embodiments, a video doorbell device 20*b* may be a device configured to capture media such as one or more of audio, images, or video. To this end, video doorbell device 20*b* may include one or more still image cameras, video cameras, microphones, etc. As an example, the video doorbell device 20*b* may be a network-connected doorbell (e.g., a "smart" doorbell) that has one or more cameras, microphones, network interfaces, and/or other electronic components. According to some embodiments, video doorbell device 20*b* may be configured to capture and transmit authentication data to computing environment 14*b* via network 16, where the authentication data may comprise image data (e.g., image of optically capturable passcode 26), video data (e.g., video of optically capturable passcode 26), audio data (e.g., recorded audible passcode 24, etc. Further, in some embodiments, video doorbell device 20*b* is configured to perform facial recognition on captured media (e.g., one or more of audio, image(s) or video), detect a recognized face of a person in video generated by video doorbell device 20*b* and send an indication of a recognized person being detected to computing environment 14*b*.

In some embodiments, in response to the computing environment 14*b* receiving audible passcode 24 and/or optically capturable passcode 26, the computing environment 14*b* is configured to transmit, to computing environment 14*a*, passcode 24 and/or passcode 26.

In some embodiments, computing environment 14*b* may be configured to apply analytics to at least a portion of the media received from video doorbell device 20*b*. For example, computing environment 14*b* may be configured to perform facial recognition on media received from video doorbell device 20*b* to determine whether the analyzed media matches a known profile, i.e., a recognized person is detected in the media. The known profile may correspond to a profile of a family member, vendor, guest, helper, or other person that has been registered in a library of individuals known to one or more authorized users of the premises monitoring system 12. In some embodiments, if the analyzed data matches a known user profile, computing environment 14*b* transmits a message to computing environment 14*a* indicating that a recognized person has been detected at the premises.

Figure 3:
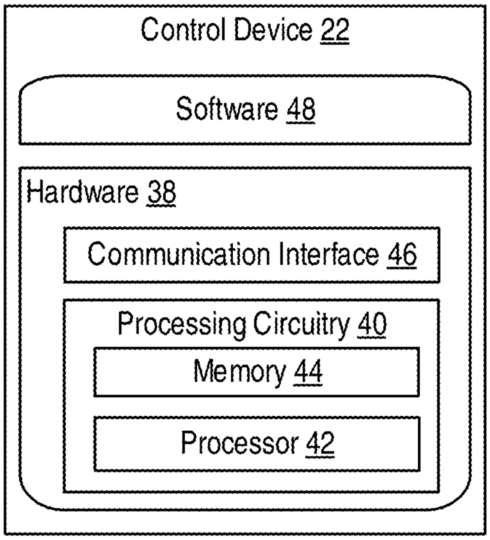
FIG. 3 is a block diagram of an example control device of FIG. 1 and/or FIG. 2 according to some embodiments of the present disclosure.

Referring now to FIG. 3 there is shown a block diagram illustrating an example control device 22 of premises monitoring system 12. As shown, control device 22 comprises hardware 38. The hardware 38 may include processing circuitry 40. The processing circuitry 40 may include one or more processors 42 and one or more memories 44. Each processor 42 may include and/or be associated with one or more central processing units, data buses, buffers, and interfaces to facilitate operation. In addition to or instead of a processor 42 and memory 44, the processing circuitry 40 may comprise other types of integrated circuitry that perform various functionality. Integrated circuitry may include one or more processors 42, processor cores, field programmable gate arrays (FPGAs), application specific integrated circuits (ASICs), graphics processing units (GPUs), Systems on Chips (SoCs), or other components configured to execute instructions. The processor 42 may be configured to access (e.g., write to and/or read from) the memory 44, which may comprise any kind of volatile and/or nonvolatile memory, e.g., cache, buffer memory, random access memory (RAM), read-only memory (ROM), optical memory, and/or erasable programmable read-only memory (EPROM). Further, memory 44 may be embodied in the form of one or more storage devices. The processing circuitry 40 may be configured to perform various functionality described herein. For example, computer instructions may be stored in memory 44 and/or another computer-readable medium that, when executed by processor 42, causes the processor 42 to perform various functionality described herein.

Hardware 38 may include communication interface 46 facilitating communication between control device 22 and one or more elements in system 10. For example, communication interface 46 may be configured for establishing and maintaining at least a wireless or wired connection with one or more elements of system 10 such as premises devices 20 and/or computing environment 14.

Control device 22 further has software 48 (which may include one or more software applications) stored internally in, for example, memory 44, or stored in external memory (e.g., database, storage array, network storage devices, etc.) accessible by the control device 22 via an external connection. Software 48 may include any software or program that configures processing circuitry 40 to perform the steps or processes of the present disclosure.

The processing circuitry 40 may be configured to control any of the methods and/or processes described herein and/or to cause such methods, and/or processes to be performed, e.g., by control device 22. Processor 42 corresponds to one or more processors 42 for performing control device 22 functions described herein. The memory 44 is configured to store data and/or files and/or other information/data. In some embodiments, the software 48 may include instructions that, when executed by the processor 42 and/or processing circuitry 40, causes the processor 42 and/or processing circuitry 40 to perform the processes described herein with respect to control device 22. Accordingly, by having computer instructions stored in memory 44 accessible to the processor 42, the processor 42 may be configured to perform the actions described herein.

Figure 4:
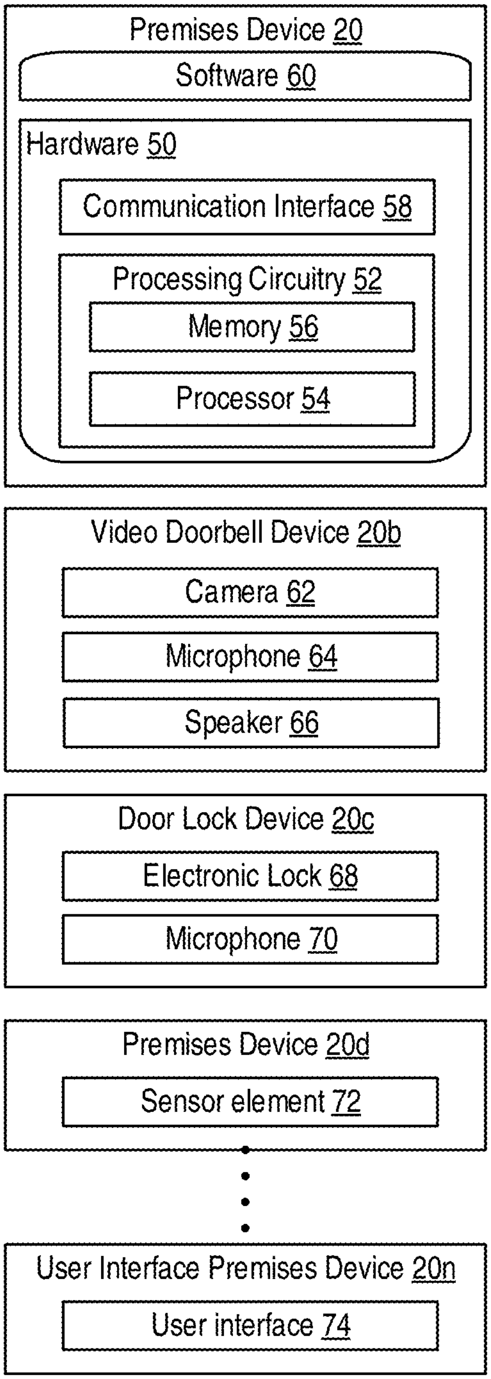
FIG. 4 is a block diagram of example premises devices of FIG. 1 and/or FIG. 2 according to some embodiments of the present disclosure.

FIG. 4 is a block diagram illustrating several example premises devices 20*a-n* (referred to collectively herein as premises devices 20) according to some embodiments of the present disclosure. As shown, premises device 20*a* comprises hardware 50. The hardware 50 may include processing circuitry 52. The processing circuitry 52 may include one or more processors 54 (i.e., one or more premises device processors) and one or more memories 56. Each processor 54 may include and/or be associated with one or more central processing units, data buses, buffers, and interfaces to facilitate operation. In addition to or instead of a processor 54 and memory 56, the processing circuitry 52 may comprise other types of integrated circuitry that performs various functionality. Integrated circuitry may include one or more processors 54, processor cores, FPGAs, ASICs, GPUs, SoCs, or other components configured to execute instructions. The processor 54 may be configured to access (e.g., write to and/or read from) the memory 56, which may comprise any kind of volatile and/or nonvolatile memory, e.g., cache, buffer memory, RAM, ROM, optical memory, and/or EPROM. Further, memory 56 may be embodied in the form of one or more storage devices. The processing circuitry 52 may be configured to perform various functionality described herein. For example, computer instructions may be stored in memory 56 and/or another computer-readable medium that, when executed by processor 54, causes the processor 54 to perform various functionality associated premises device 20*a*.

Hardware 50 may include communication interface 58 facilitating communication between premises device 20*a* and one or more elements in system 10. For example, communication interface 58 may be configured for establishing and maintaining at least a wireless or wired connection with one or more elements of system 10 such as control device 22 and/or computing environment 14.

Premises device 20*a* further has software 60 (which may include one or more software applications) stored internally in, for example, memory 56, or stored in external memory (e.g., database, storage array, network storage devices, etc.) accessible by the premises device 20*a* via an external connection. Software 60 may include any software or program that configures processing circuitry 52 to perform the steps or processes of the present disclosure.

The processing circuitry 52 may be configured to control any of the methods and/or processes described herein and/or to cause such methods, and/or processes to be performed, e.g., by premises device 20*a*. Processor 54 corresponds to one or more processors 54 for performing premises device 20*a* functions described herein. The memory 56 is configured to store data and/or files and/or other information/data. In some embodiments, the software 60 may include instructions that, when executed by the processor 54 and/or processing circuitry 52, causes the processor 54 and/or processing circuitry 52 to perform the processes described herein with respect to premises device 20*a*. Accordingly, by having computer instructions stored in memory 56 accessible to the processor 54, the processor 54 may be configured to perform the actions described herein.

With reference to the video doorbell device 20*b* in FIG. 4, in one or more embodiments, video doorbell device 20*b* includes the same or similar hardware as premises device 20*a* described above, except that video doorbell device 20*b* further includes one or more of camera 62, microphone 64 or speaker 66. Camera 62 is configured to capture media such as, for example, at least one video or still image. Microphone 64 is configured to capture media such as, for example, audio proximate microphone 64. In one example, microphone 64 may capture an audible password spoken by a person proximate to microphone 64. Speaker 66 may be configured to emit one or more audible sounds.

In one or more embodiments, video doorbell device 20*b* may be a networked doorbell having a camera 62 and a microphone 64.

With reference to the door lock device 20*c* in FIG. 4, in one or more embodiments, door lock device 20*c* includes the same or similar hardware as premises device 20*a* described above, except that door lock device 20*c* further includes electronic lock 68. For example, electronic lock 68 may comprise an electrically actuatable door locking mechanism where door lock device 20*c* may receive a command to lock or unlock the door locking mechanism and actuate the door locking mechanism according to the command. In one or more embodiments, door lock device 20*c* is positioned at and/or proximate an access point or location of premises 17. In some embodiments, door lock device 20*c* may include a microphone 70 for capturing audible sounds such as, for example, audible passcode 24.

In one or more embodiments, premises device 20*d* includes the same or similar hardware as premises device 20*a* described above, except that door lock device 20*c* includes one or more sensor elements 72 configured to sensing as described herein. In one or more embodiments, premises device 20*n* is a monitoring interface device that includes the same or similar hardware as premises device 20*a* described above, except that premises device 20*n* further includes user interface 74 such as a control panel touchscreen or buttons to allow a user to interface with premises device 20*n*. In other words, each premises device 20 may comprise hardware and software similar to the hardware and software described with respect to premises device 20*a*, but with other elements to provide desired functionality, e.g., sensing, locking, user interface, etc.

Figure 5:
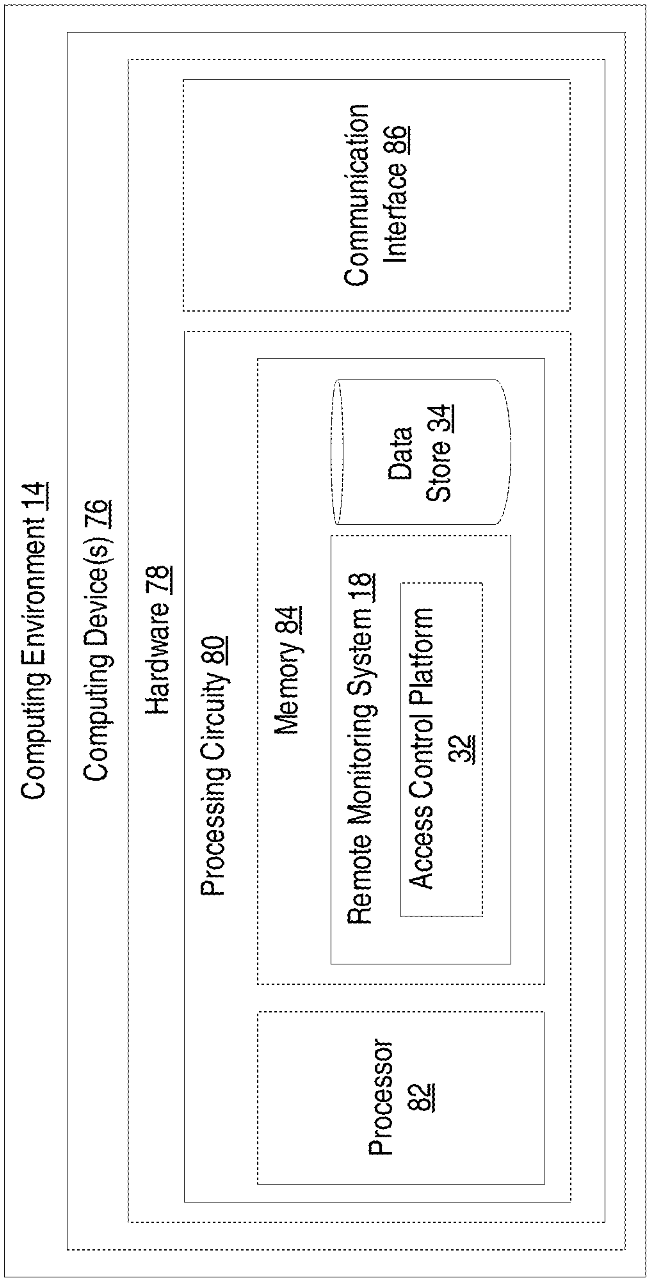
FIG. 5 is a block diagram of an example computing device of FIG. 1 and/or FIG. 2 according to some embodiments of the present disclosure.

FIG. 5 is a block diagram illustrating the example computing environment 14 according to various embodiments. As shown, the computing environment 14 may include one or more computing devices 76. In embodiments using multiple computing devices 76, computing devices 76 may be located in a single installation or distributed among many different geographic locations. As shown, each computing device 76 comprises hardware 78. The hardware 78 may include processing circuitry 80. The processing circuitry 80 may include one or more processors 82 and one or more memories 84. Each processor 82 may include and/or be associated with one or more central processing units, data buses, buffers, and interfaces to facilitate operation. In addition to or instead of a processor 82 and memory 84, the processing circuitry 80 may comprise other types of integrated circuitry that perform various functionality. Integrated circuitry may include one or more processors 82, processor cores, FPGAs, ASICs, GPUs, SoCs, or other components configured to execute instructions. The processor 82 may be configured to access (e.g., write to and/or read from) the memory 84, which may comprise any kind of volatile and/or nonvolatile memory, e.g., cache, buffer memory, RAM, ROM, optical memory, and/or EPROM. Further, memory 84 may be embodied in the form of one or more storage devices. The processing circuitry 80 may be configured to perform various functionality described herein. For example, computer instructions may be stored in memory 84 and/or another computer-readable medium that, when executed by processor 82, causes the processor 82 to perform various functionality.

Hardware 78 may include communication interface 86 facilitating communication between one or more elements in system 10. For example, communication interface 86 may be configured to establish and maintain at least a wireless or wired connection with one or more elements of system 10, such as control devices 22, premises devices 20, etc.

The processing circuitry 80 may be configured to control any of the methods and/or processes described herein and/or to cause such methods and/or processes to be performed, e.g., in computing environment 14. Processor 82 corresponds to one or more processors 82 for performing computing device 76 functions described herein.

The memory 84 is configured to store data, such as files, remote monitoring system data, and/or other information/data. Also stored in the memory 84 and executable by the processor 82 are the remote monitoring system 18 and access control platform 32. Although FIG. 5 shows the remote monitoring system 18 and access control platform 32 is in a single computing device 76, the remote monitoring system 18 and access control platform 32 may execute in multiple computing devices 76 of the computing environment 14. To perform the functionality of the remote monitoring system 18 and access control platform 32, the memory 84 may include instructions that, when executed by the processor 82 and/or processing circuitry 80, causes the computing device 76 to perform the functionality performed by the remote monitoring system 18 and access control platform 32 described herein.

Figure 6:
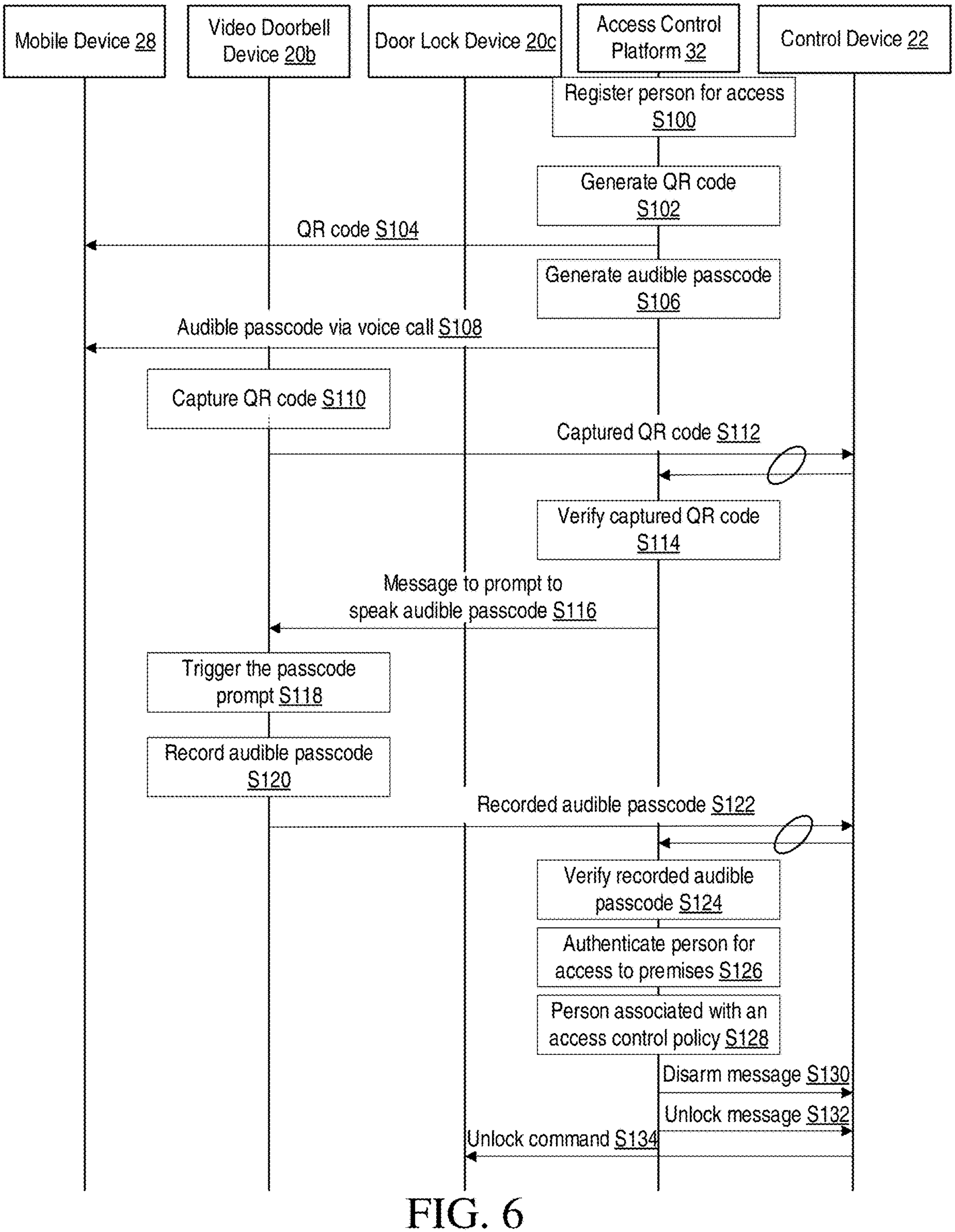
FIG. 6 is an example signaling diagram according to some embodiments of the present disclosure.

FIG. 6 is a signaling diagram of an example process according to various embodiments described herein. Access control platform 32 is configured to register a person for access to the premises (Block S100). In response to registering the person for access, access control platform 32 generates a QR code 26 and indicates the QR code 26 to mobile device 28 (Blocks S102-S104). For example, a user (e.g., homeowner) registered to operate the premises monitoring system 12 inputs a phone number into a mobile software application or online portal via the user's mobile phone or other device, where the phone number is associated with a person (e.g., guest user) to whom the user wants to grant at least temporary access to the premises 17. Access control platform 32 receives the phone number and sends a message to the guest user's mobile device 28.

In one example, the message comprises a uniform resource locator (URL) to a webpage. The guest user receives the SMS message via mobile device 28 28 and selects the URL, causing a web browser to open and load the webpage. The webpage may comprise terms and conditions for the guest user to review and accept. The webpage can further comprise instructions for the guest user on how to gain access to premises 17. After the guest accepts the terms and conditions, access control platform 32 generates a QR code 26 and embeds it in the webpage that is rendered in the web browser on mobile device 28. The guest user can save the QR code 26 by adding it to the mobile device 28's digital wallet or saving the QR code 26 in the mobile device 28's memory. In another example, the message comprises a QR code 26.

In response to registering the person and/or indicating the QR code 26, access control platform is configured to generate an audible passcode (Block S106). Access control platform 32 is configured to indicate or communicate the audible passcode 24 to the mobile device 28 via, for example, a voice call (Block S108). For example, access control platform 32 performs a voice call to the guest user's mobile device 28. When the guest user answers the call on the mobile device 28, an automated message provides a verbal passcode for the guest user. For example, the audible message can be, "Your verbal passcode is 'ORANGE.' Please remember this verbal passcode. When you arrive at the home and scan your QR code 26, you will be prompted to state your verbal passcode to gain entry to the home."

Video doorbell device **20*b* is configured to capture an image and/or video of an QR code 26 (Block S110). For example, when the person (e.g., guest user) arrives at premises 17, a person may display the QR code 26 on a display of mobile device 28 such that video doorbell device 20*b* can capture an image and/or video of the displayed QR code 26. Video doorbell device 20*b* is configured to transmit the image and/or video of the QR code 26 to control device 22 for transmission to access control platform 32 to verify the QR code 26 (Block S112). In one or more other embodiments, the QR code 26 may be verified by control device 22, the device that captured the QR code 26 (e.g., video doorbell device 20*b*), or another entity associated with the premises monitoring system 12 such that the QR code 26** does not need to be transmitted to access control platform for verification.

Access control platform 32 is configured to receive and verify the image and/or video of the QR code 26 (Block S114). For example, access control platform 32 may compare the received QR code 26 with the QR code 26 generated at Block S102 and stored in data store 34 where a match between the QR codes 26 corresponds to the verification of the received QR code 26.

In response to verifying the received QR code 26, access control platform 32 is configured to transmit a message and/or command to video doorbell device **20*b* to prompt a person proximate the video doorbell device 20*b* to speak the audible passcode 24 (Block S116). Video doorbell device 20*b* is configured to trigger an audible passcode prompt to urge the person proximate the video doorbell device to speak the audible passcode (Block S118). For example, after the QR code 26 has been verified, the guest user is prompted, by video doorbell device 20*b* and/or another device associated with the premises monitoring system 12, to state the audible passcode 24 that was provided via the voice call. For example, the video doorbell device 20*b*** (or door lock device 20*c* or other device with a speaker) can play a recording to prompt the guest user to state the audible passcode 24. In one example, the record states, "Please state your verbal passcode into the video doorbell."

In response to triggering the passcode prompt, video doorbell device 20*b* is configured to record audio using microphone 64 and/or camera 62 (Block S120). For example, the guest user states the audible passcode 24, and the video doorbell device 20*b* records the audio. Video doorbell device 20*b* is configured to transmit the recorded audio (comprising the audible passcode 24) to control device 22 for transmission to access control platform 32 for verification of the audible passcode 24 (Block S122). Access control platform 32 is configured to receive and verify the recorded audible passcode 24 (Block S124). That is, the access control platform 32 verifies the verbal passcode using the audio recording. Speech recognition can be applied to the audio recording to convert the audio to text for the purposes of verifying the verbal passcode. For example, access control platform 32 may compare the received audible passcode 24 with the audible passcode generated at Block S106 and stored in data store 34 where a match between the audible passcodes 24 corresponds to the verification of the received audible passcode 24. In one or more embodiments, video doorbell device 20*b*, control device 22, and/or device associated with premises monitoring system 12 verifies the verbal passcode using the audio recording.

In response to verifying the recorded audible passcode 24, access control platform 32 is configured to authenticate a person associated with mobile device 28 (Block S126). At block S128, the process further comprises, in response to authenticating the person, the access control platform 32 determines the authenticated person is allowed access to the premises 17 based on at least one access control policy. For example, access control platform 32 may be configured to determine whether the authenticated person is associated with one or more access policies and whether at least one of the access policies are met. For example, an access control policy may define that the authenticated person is allowed access to the premises at a specific time and date (e.g., time-based access) or in response to a detected event (e.g., event-based access). Hence, access control platform 32 may verify the type of access the authenticated person is allowed and determine whether one or more access policies (e.g., access policies based on time, event, alarm, etc.) are satisfied.

At blocks S130-S134, the process further comprises, in response to determining the authenticated person is allowed access to the premises according to an access control policy, the access control platform 19 causes the premises monitoring system 12 to disarm and causes at least one lock securing the access location of the premises to unlock the access location. For example, if access control platform 32 determines that one or more access policies are satisfied, access control platform 32 may transmit one or more commands to premises monitoring system 12 that cause premises monitoring system 12 to disarm and that cause at least one door lock device 20*c* (e.g., an electronic door lock) to unlock.

Further, in various embodiments, access control platform 32 may be configured to determine that the person has left the premises 17. For example, an authenticated person has accessed the premises 17, after Blocks S130-S134 are performed, and access control platform 32 may determine that the person has left the premises 17 based on, for example, at least one of signaling, data or indications received from premises monitoring system 12. In response to determining that the person has left the premises 17, access control platform 32 may cause the lock (e.g., door lock device 20*c*) to transition from the unlocked state to the locked state and cause the premises monitoring system 12 to transition from the disarmed state to the armed state.

Further, access control platform 32 and/or premises monitoring system 12 may maintain a timestamped log entry for each time an entry is made to premises 17 using one of the types of access as described herein. The log can be reviewed periodically, and permissions (e.g., types of access) can be dynamically modified.

In one or more embodiments, different devices can be used to capture the QR code 26 and/or the verbal passcode 24. For example, instead of video doorbell device 20*b*, another type of device with a camera can be used to capture the QR code 26. Additionally, any device with a microphone can be used to capture the verbal passcode 24. For example, if door lock device 20*c* has a microphone, door lock device 20*c* can be used to capture the verbal passcode 24. The device that captures the QR code 26 can be the same or different from the device that captures the verbal passcode 24.

Further, in one or more embodiments, instead of providing the guest user with both the QR code 26 and audible passcode 24 in response to the user submitting the guest user's cell phone number, the QR code 26 and/or the verbal passcode 24 can be provided to the guest user only after there is an indication that the guest user may have arrived at the home. For example, when the user submits the guest user's cell phone number, the guest user can be provided with only the QR code 26, and the voice phone call with the verbal passcode 24 can be initiated by access control platform 32 in response to the guest user scanning the QR code 26 while at premises 17. This could potentially reduce the risk of the guest user sharing the QR code 26 and verbal passcode 24 with someone else. In one or more embodiments, the guest user may be provided with the QR code 26 and verbal audible passcode 24 in response to the video doorbell device 20*b* recognizing the guest user's face using facial recognition.

Further, in one or more embodiments, instead of or in addition to a verbal passcode 24, the voice phone call may provide the guest user with an alphanumeric code that the guest user enters via a keypad on door lock device 20*c* or other device associated with premises monitoring system 12 and/or premises 17.

Figure 7A:
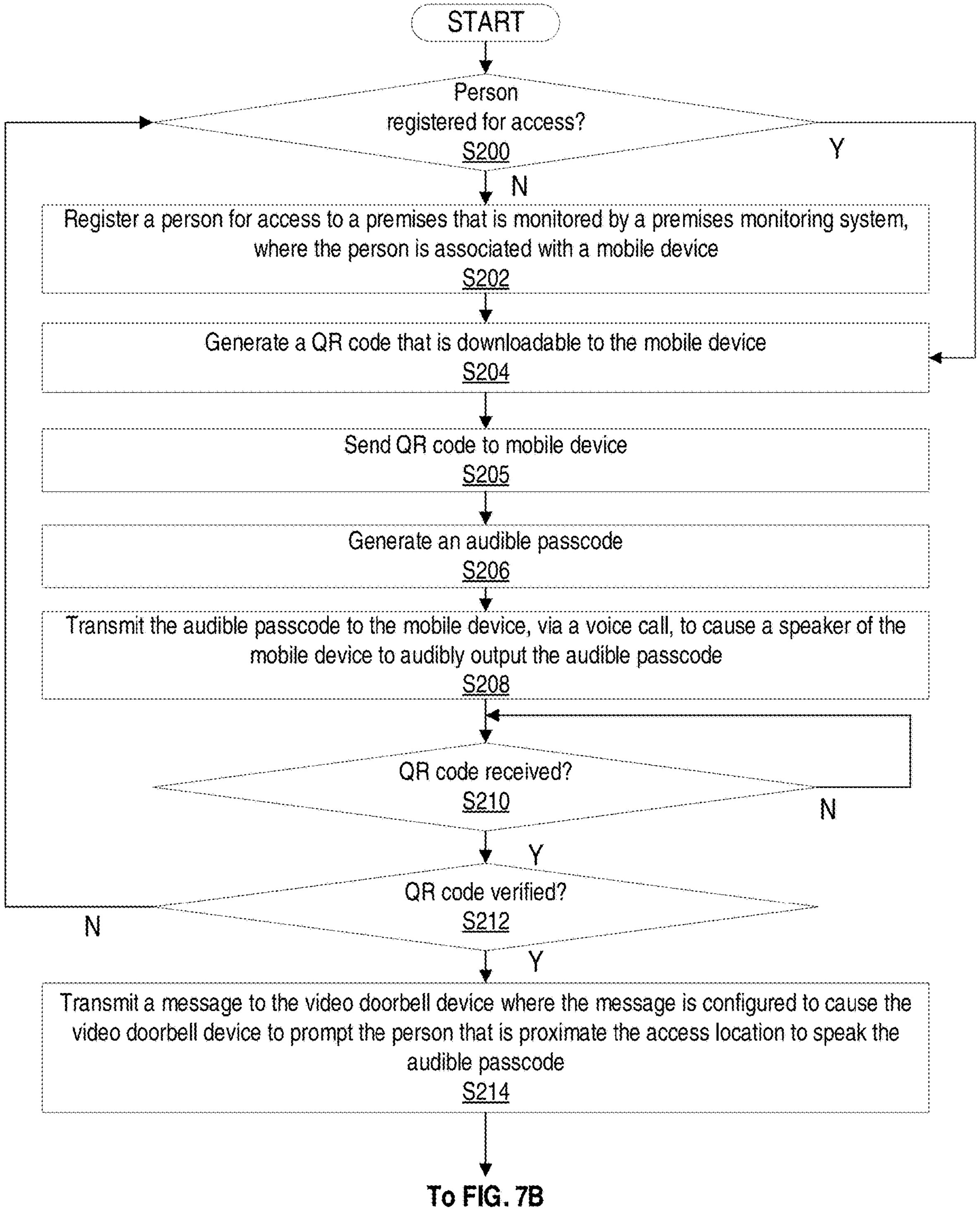
FIGS. 7A-7B is a flowchart of example functionality performed by the computing device of FIG. 1, FIG. 2 and/or FIG. 3 according to some embodiments of the present disclosure.
Figure 7B:
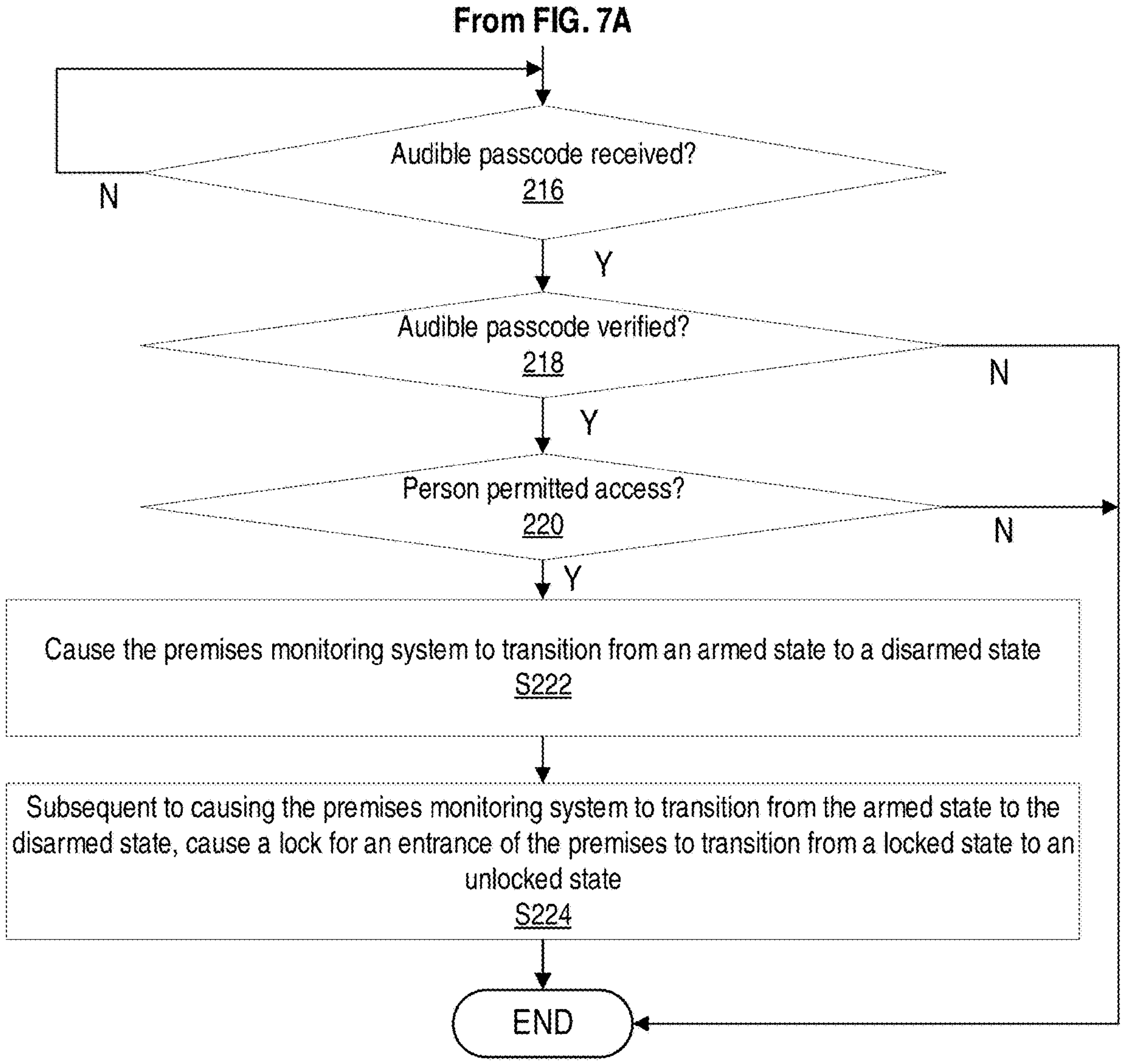

FIGS. 7A-7B are a flowchart of an example process performed by access control platform 32 according to various embodiments described herein. At block S200, the access control platform 32 determines whether a person (e.g., guest) is registered for access to premises 17. If the person is not registered, the access control platform 32 registers the person for access to a premises 17 that is monitored by a premises monitoring system 12, where the person is associated with a mobile device 28, as described herein (Block S202). The person may be registered as described with respect to FIG. 6. If the person is registered for access due to, for example, being previously registered, the process moves to block S204. At block S204, the access control platform 32 generates a QR code 26 that is downloadable to the mobile device 28, as described herein. At block S205, the access control platform 32 sends the QR code to mobile device 28, as described herein. For example, the access control platform 32 may communicate the QR code to mobile device 28 via network 16.

At block S206, the access control platform 32 generates an audible passcode 24, as described herein. At block S208, the access control platform 32 transmits the audible passcode 24 to the mobile device 28, via a voice call, to cause a speaker of the mobile device 28 to audibly output the audible passcode, as described herein. To this end, the access control platform 32 can initiate a telephone call to the mobile device 28 using the telephone number provided during registration of the person and, when the telephone call is answered, cause the audible passcode to be played on the call. For example, when the telephone call is answered, the access control platform 32 can cause playback of an audible message that states, "Your password for entering the home is the word 'orange.' When you are at the home and prompted to state your password, please clearly state the word 'orange' into the smart lock or smart doorbell." At block S210, the access control platform 32 determines whether data corresponding to a QR code has been received, as described herein. For example, the data corresponding to QR code may be a digital image of a captured QR code received from premises monitoring system 12 that captured the image of the QR code.

At block S212, the access control platform 32 verifies whether the QR code 26 corresponding to the received data (e.g., the QR code depicted in a captured image) corresponds to the QR code 26 that was generated at block S204, as described herein. If the verification fails (e.g., the captured QR code 26 does not match the generated QR code 26), the process may end, return to block S200 or attempt to re-capture the QR code. If the access control platform 32 verifies that the QR code 26 corresponding to the received data matches the generated QR code 26, then the process proceeds to block S214, and the access control platform 32 transmits a message to the video doorbell device 20*b*, where the message is configured to cause the video doorbell device 20*b* to prompt the person that is proximate the access location to speak the audible passcode 24 that was previously provided at block S208.

At block S216, the access control platform 32 determines whether it has received data corresponding to an audible passcode recorded by a premises device 20 of the premises monitoring system 12. If data corresponding to the recorded audible passcode has not been received, the process may repeat block S216 for a predefined period of time or may end. At block S218, if data corresponding to the audible passcode has been received, the access control platform 32 verifies the audible passcode. For example, the access control platform 32 may verify that the audio passcode 24 recorded by a device at the premises 17 corresponds to the audible passcode 24 generated by the access control platform 32 at block S206, as described herein. Accordingly, if the access control platform 32 determines that the audible passcode 24 and QR code 25 captured by one or more premises devices 20 of the premises monitoring system 12 match the audible passcode 24 and QR code 25 previously generated by the access control platform 32, then the access control platform 32 deems the person at the premises 17 authenticated.

At block S220, access control platform 32 then determines whether the authenticated person (e.g., guest user) is permitted access to the premises 17 according to an access control policy, as described herein. If the authenticated person is not permitted access to premises 17, the process may end or return to block S200. For example, although the person was authenticated, the person may be associated with an access control policy that permits the person access to the premises 17 only during a specific period of time, during a specific event, etc. (e.g., one or more of time-based access, alarm-based access, event-based access or guest-based access). If the person attempts to access the premises 17 when the person is not permitted access pursuant to the access control policy, then the access control platform 32 will deny access to the person, even though the person has been authenticated.

At block S222, if the access control platform 32 determines that the person is permitted access to the premises 17 according to the access control policy, the access control platform 32 causes a premises monitoring system 12 at the premises 17 to transition from an armed state to a disarmed state, as described herein. At block S224, the access control platform 32, subsequent to causing the premises monitoring system 12 to transition from the armed state to the disarmed state, causes a lock for an entrance of the premises 17 to transition from a locked state to an unlocked state, as described herein. In this way, the person can open the unlocked door without a false alarm being triggered by the premises monitoring system 12.

Figure 8:
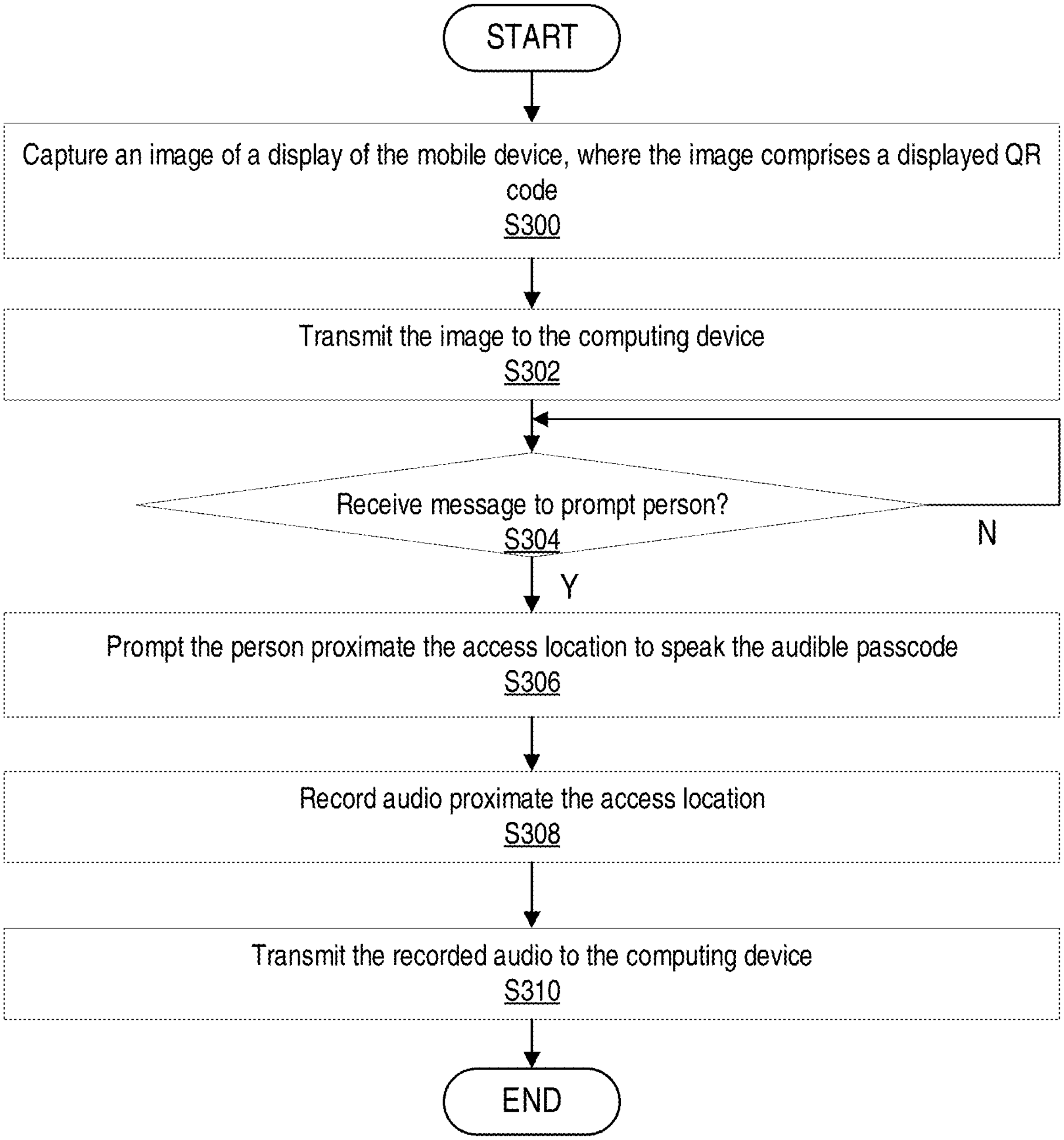
FIG. 8 is a flowchart of example functionality performed by a premises device of FIG. 1, FIG. 2 and/or FIG. 4 according to some embodiments of the present disclosure.

FIG. 8 is a flowchart of an example process performed by video doorbell device 20*b* according to some embodiments of the present disclosure. Beginning at block S300, the video doorbell device 20*b* captures an image of a display of the mobile device 28, where the image comprises a displayed QR code 26, as described herein (Block S300). Video doorbell device 20*b* then transmits the image to the access control platform 32 (Block S302). Video doorbell device 20*b* determines whether it has received a message to prompt a person proximate the access location to speak an audible passcode 24 (Block S304). If the message has not been received, video doorbell device 20*b* may repeat the determination of block S304. In one or more embodiments described herein, a countdown timer may be initiated to limit the amount of times a step may be repeated.

If video doorbell device 20*b* determines that a message prompt has been received, the video doorbell device 20*b* prompts the person close to the access location to speak the audible passcode 24 (Block S306). For example, video doorbell device 20*b* may use speaker 66 to audibly prompt the person to speak the audible passcode 24. In various embodiments, video doorbell device 20*b* may comprise or be associated with other feedback mechanisms, such as visual feedback, haptic feedback, etc., that may be used by video doorbell device 20*b* to prompt the person for the audible passcode 24. One or more of the other feedback mechanisms may be part of the video doorbell device 20*b*, other premises device 20, or may be a separate device that is proximate to the access location that is in communication with control device 22.

Video doorbell device 20*b* then, in response to the prompt, records audio that is proximate to the access location where the recorded audio comprises the audible passcode 24 (Block S308). Then, video doorbell device 20*b* transmits the recorded audio to the access control platform 32 (Block S310). In various embodiments, video doorbell device 20*b* may repeat block S306 if the recorded audio does not contain an audible passcode 24. The determination of whether to repeat block S306 may be determined and/or initiated by video doorbell device 20*b* or access control platform 32.

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects. Any process, step, action and/or functionality described herein may be performed by, and/or associated to, a corresponding module and/or unit, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, the accompanying drawings are not to scale. A variety of modifications and variations are possible in light of the above teachings without departing from the scope and spirit of the present disclosure.

What is claimed is:

1. A system, comprising:

at least one computing device, comprising:

at least one processor; and at least one memory storing a plurality of instructions that, when executed by the at least one processor, cause the at least one processor to:

register a person for access to a premises that is monitored by a premises monitoring system, the person being associated with a mobile device;

generate a quick response (QR) code that is downloadable to the mobile device;

generate an audible passcode; and cause transmission of the audible passcode to the mobile device, via a voice call, to cause a speaker of the mobile device to audibly output the audible passcode;

a video doorbell device proximate an access location of a premises, the video doorbell device configured to:

capture an image of a display of the mobile device, the image comprising a displayed QR code; and transmit the image to the computing device;

the instructions being further configured to cause the at least one processor of the at least one computing device to:

receive the image;

verify that the displayed QR code in the image corresponds to the QR code; and in response to verifying that the displayed QR code corresponds to the QR code, transmit a message to the video doorbell device, the message configured to cause the video doorbell device to prompt the person that is proximate the access location to speak the audible passcode;

the video doorbell device being configured to:

receive the message;

in response to the message, prompt the person proximate the access location to speak the audible passcode;

record audio proximate the access location; and transmit the audio to the at least one computing device; and the instructions being further configured to cause the at least one processor of the at least one computing device to:

verify that the audio corresponds to the audible passcode;

in response to verifying that the audio corresponds to the audible passcode, determine that the person is authenticated;

in response to determining that the person is authenticated, determine that the person is permitted access to the premises according to an access control policy;

in response to determining that the person is permitted access to the premises according to the access control policy, cause the premises monitoring system to transition from an armed state to a disarmed state; and subsequent to causing the premises monitoring system to transition from the armed state to the disarmed state, cause a lock for an entrance of the premises to transition from a locked state to an unlocked state.

2. The system of claim 1, wherein the instructions are further configured to cause the at least one computing device to:

determine that the person has left the premises; and in response to determining that the person has left the premises:

cause the lock to transition from the unlocked state to the locked state; and cause the premises monitoring system to transition from the disarmed state to the armed state.

3. The system of claim 1, wherein the instructions are further configured to cause the at least one computing device to, in response to authenticating the person and determining that the person is permitted access to the premises, cause the premises monitoring system to transition from an armed state to a disarmed state.

4. A system, comprising:

at least one computing device configured to communicate with a premises monitoring system, the premises monitoring system configured to monitor a premises, the at least one computing device comprising:

at least one processor; and at least one memory storing a plurality of instructions that, when executed by the at least one processor, cause the at least one processor to:

receive an image of an optically capturable passcode, the image being captured by the premises monitoring system;

in response to verifying that the optically capturable passcode in the image corresponds to a predefined optically capturable passcode, transmit a message to a premises device of the premises monitoring system, the message being configured to cause the premises device to prompt a person to speak an audible passcode;

receive recorded audio of the person speaking the audible passcode captured by the premises monitoring system;

authenticate the person based on the optically capturable passcode and the audible passcode;

determine that the person is permitted access to the premises according to an access control policy; and in response to authenticating the person and determining that the person is permitted access to the premises, cause a lock securing an access point of the premises to unlock.

5. The system of claim 4, wherein the optically capturable passcode is a quick response (QR) code that is downloadable to a mobile device associated with the person.

6. The system of claim 4, wherein the instructions are further configured to cause the at least one computing device to:

register the person for access to the premises;

in response to registering the person, generate the optically capturable passcode that is downloadable to a mobile device associated with the person; and generate the audible passcode; and cause transmission of the audible passcode to the mobile device, via a voice call.

7. The system of claim 6, wherein the instructions are further configured to cause the at least one computing device to: verify that the recorded audio corresponds to the generated audible passcode; and in response to verifying that the recorded audio corresponds to the generated audible passcode, determine that the person has been authenticated.

8. The system of claim 4, wherein the access control policy is an alarm-based policy that permits the person to access the premises in response to an alarm event being detected by the premises monitoring system.

9. The system of claim 4, wherein the access control policy is an event-based policy that permits the person to access the premises in response to a predefined event being detected by the premises monitoring system.

10. The system of claim 4, wherein the access control policy is a time-based policy that permits the person to access the premises based on time.

11. The system of claim 4, wherein a premises device of the premises monitoring system is a video doorbell device that is configured to capture the optically capturable passcode and the audible passcode.

12. A method implemented by a system, the system comprising at least one computing device, the method comprising:

receiving an image of an optically capturable passcode, the image being captured by a premises monitoring system that is configured to monitor a premises;

in response to verifying that the optically capturable passcode in the image corresponds to a predefined optically capturable passcode, transmitting a message to a premises device of the premises monitoring system, the message being configured to cause the premises device to prompt a person to speak an audible passcode;

receiving recorded audio of the person speaking the audible passcode captured by the premises monitoring system;

authenticating the person based on the optically capturable passcode and the audible passcode;

determining that the person is permitted access to the premises according to an access control policy; and in response to authenticating the person and determining that the person is permitted access to the premises, causing a lock securing an access point of the premises to unlock.

13. The method of claim 12, further comprising:

registering the person for access to the premises;

in response to registering the person, generating the optically capturable passcode that is downloadable to a mobile device associated with the person; and generating an audible passcode; and causing transmission of the audible passcode to the mobile device, via a voice call.

14. The method of claim 13, further comprising: verifying that the recorded audio corresponds to the generated audible passcode; and in response to verifying that the recorded audio corresponds to the generated audible passcode, determine that the person has been authenticated.

15. The method of claim 12, further comprising, in response to authenticating the person and determining that the person is permitted access to the premises, causing the premises monitoring system to transition from an armed state to a disarmed state.

16. The method of claim 12, wherein the access control policy is one of:

an alarm-based policy that permits the person to access the premises in response to an alarm event being detected by the premises monitoring system;

an event-based policy that permits the person to access the premises in response to a predefined event being detected by the premises monitoring system; or a time-based policy that permits the person to access the premises based on time.

17. The method of claim 12, wherein a premises device of the premises monitoring system is a video doorbell device that is configured to capture the optically capturable passcode and the audible passcode.

18. The method of claim 12, wherein the optically capturable passcode is a quick response (QR) code that is downloadable to a mobile device associated with the person.

* * * * *